United States Patent [19]
Maeda et al.

[11] Patent Number: 5,866,668
[45] Date of Patent: Feb. 2, 1999

[54] HEAT CURABLE COMPOSITION

[75] Inventors: Nobuhiko Maeda, Amagasaki; Tatsuya Okuno, Kurita; Yoshiya Hattori, Kyoto; Johshi Gotoh, Nishinomiya, all of Japan

[73] Assignee: Sunstar Giken Kabushiki Kaisha, Takatsuki, Japan

[21] Appl. No.: 714,180

[22] PCT Filed: Mar. 22, 1995

[86] PCT No.: PCT/JP95/00528

§ 371 Date: Sep. 27, 1996

§ 102(e) Date: Sep. 27, 1996

[87] PCT Pub. No.: WO95/26374

PCT Pub. Date: Oct. 5, 1995

[30] Foreign Application Priority Data

Mar. 28, 1994 [JP] Japan ..................................... 6-057059

[51] Int. Cl.$^6$ .......................... C08G 18/32; C08G 18/10; B32B 5/16
[52] U.S. Cl. ...................... 528/60; 252/182.12; 428/402; 428/402.24; 428/403; 428/404; 428/406; 428/407; 528/61; 528/67; 528/68; 528/44; 525/123; 525/125; 525/129; 525/130; 525/131; 524/783; 524/786; 524/788; 524/789
[58] Field of Search ...................... 252/182.12; 428/402, 428/403, 402.24, 404, 406, 407; 528/60, 61, 68, 67, 444; 525/123, 125, 129, 130, 131; 524/783, 786, 788, 789, 791

[56] References Cited

U.S. PATENT DOCUMENTS 4,869,961   9/1989   Iwai et al. ................................ 428/407

FOREIGN PATENT DOCUMENTS 6155109   3/1986   Japan .
1502436   8/1989   Japan .

*Primary Examiner*—Rabon Sergent
*Attorney, Agent, or Firm*—Jacobson, Price, Holman & Stern, PLLC

[57] ABSTRACT

An object of the invention is to provide a heat curable composition having both of an excellent storage stability and low-temperature curability. The heat curable composition of this invention comprises (A) a polyisocyanate compound and an urethane prepolymer having a terminal active isocyanate group which is prepared by reacting a polyol component with an excess amount of a polyisocyanate compound, which are used each alone or in a combination threof; and (B) a fine particles-coated amine which is prepared by coating an active amino group on the surface of a solid amine having a melting point of $\geq 50°$ C. and a mean particle size of $\leq 20$ μm with fine particles having a mean particle size of $\leq 2$ μm in a ratio of the solid amine/the fine particles of 1/0.001 to 0.5 by weight.

7 Claims, No Drawings

3

HEAT CURABLE COMPOSITION

TECHNICAL FIELD

This invention relates to a heat curable composition, more particularly to a heat curable composition useful for an adhesive, a sealant, a coating material and other formed products having an excellent storage stability in a sealed vessel, a low-temperature curability, a rubber-like physical property and the like.

PRIOR ART

Up to this date, a one-pack type heat curable composition which is prepared by dispersing a polyamine compound in an isocyanate component has been known, and one embodiment of such composition is a one-pack type heat curable composition which is prepared by blending an urethane prepolymer having a terminal active isocyanate group, which is obtained by reacting a polyol component with an excess amount of a polyisocyanate compound, with a dispersion of a solid amine in a liquid paraffin at a temperature of $\leq 40°$ C. and the composition can be applied as an adhesive, a sealant and the like (see, Japanese Patent First Publication No. 32948/93). This known composition is cured at a temperature of over a melting point of a solid amine compound (e.g. 80° C.), therefore it has an excellent low-temperature curability. However, it cannot be applied to practical use because of its insufficient storage stability in a sealed vessel (particularly, a storage stability at 40° C.).

The storage stability is an important property in order to estimate a commercial value of a product such as an adhesive and a sealant, and further a low-temperature curability is also an important property for saving energy and saving resources. Accordingly, it is strongly demanded to develop a composition having both of the properties.

DETAILED DESCRIPTION OF THE INVENTION

Under the circumstances, the present inventors have intensively studied, and as a result, have found that by adding an additional amine-coating step onto a conventional process for preparing the known heat curable composition which comprises an isocyanate component and a solid amine, the solid amine can be dispersed more easily in an isocyanate component (a urethane prepolymer having a terminal active isocyanate group) and thereby the composition has excellent storage stability, wherein said amine-coating step comprising coating the active amino groups on the surface of the solid amine having a melting point $\geq 50°$ C. and a specific mean particle size with fine particles having a specific mean particle size, further that the composition prepared according to such process can be heat-cured under a low-temperature condition (e.g. 60° to 100° C.×10 min.) because the surface-coating of the solid amine is melted by heating to appear an active amino group on the surface thereof, and further that, in the above process, as an isocyanate component, a polyisocyanate compound can be used instead of or in a combination with an urethane prepolymer having a terminal active isocyanate group.

This invention provides a heat curable composition comprising (A) a polyisocyanate compound and an urethane prepolymer having a terminal active isocyanate group which is prepared by reacting a polyol component with an excess amount of a polyisocyanate compound, which are used each alone or in combination thereof; and (B) a fine particles-coated amine which is prepared by coating an active amino group on the surface of a solid amine having a melting point of $\geq 50°$ C. and a mean particle size of $\leq 20$ μm with fine particles having a mean particle size of $\leq 2$ μm in a ratio of the solid amine/the fine particles of 1/0.001 to 0.5 by weight.

The polyisocyanate compound used in this invention includes aromatic, aliphatic and alicyclic polyisocyanate compounds, for example, tolylene diisocyanate (TDI), diphenylmethane diisocyanate (MDI), 3,3'-dimethyl-4,4'-biphenylene diisocyanate, 1,4-phenylene diisocyanate, xylylene diisocyanate, tetramethylxylylene diisocyanate, naphthylene diisocyanate, dicyclohexylmethane-4,4'-diisocyanate, crude TDI, polymethylene polyphenyl isocyanate, isophorone diisocyanate, hexamethylene diisocyanate, hydrogenated xylylene diisocyanate, and isocyanurate, carbodiimide or biuret compounds of these isocyanate compounds, which may be used alone or in combination of two or more thereof.

The urethane prepolymer having a terminal active isocyanate group (NCO) used in this invention (abbreviated a terminal NCO prepolymer, hereinafter) can be prepared by reacting a conventional polyol component with an excess amount of a polyisocyanate compound in a equivalent ratio of 1:1.2 to 3.5. This reaction can be carried out under a certain condition, for example, at a room temperature of 60° to 90° C. for 1 to 7 hours, optionally in the presence of an appropreate reaction promoting catalyst (e.g. organic tin compound such as dibutyltin dilaurate, bismuth compound such as bismuth octynoate, tertiary amine compound such as 1,4-diaza[2.2.2]bicyclooctane, etc.) in an appropriate solvent (e.g. ethyl acetate, toluene, xylene, etc.). The resulted terminal NCO prepolymer is normally required to have a terminal NCO content of 0.5 to 5% by weight and a viscosity of 5000 to 500000 cps/20° C.

The polyol component in this invention includes, for example, polyether polyols which are made by addition polymerization between water, polyhydric alcohol (e.g. ethylene glycol, propylene glycol, glycerine, trimethylol propane, pentaerythritol, sorbitol, sucrose, etc.) and alkylene oxide [e.g. propylene oxide, or a mixture of propylene oxide and ethylene oxide, etc.)]; ethylene glycol, propylene glycol and oligoglycols thereof; butylene glycol, hexylene glycol, polytetramethylene ether glycols; polycaprolactone polyols; polyester polyols such as polyethylene adipate; polybutadiene polyols; higher fatty acid esters having hydroxyl group such as castor oil; polymer polyols which are prepared by graft polymerization of polyether polyols or polyester polyols with a vinyl monomer.

As the isocyanate component (A) of this invention, the above polyisocyanate compound and a prepolymer having a terminal NCO may be used each alone or in combination thereof.

The solid amine used in this invention includes aromatic or aliphatic amine compounds having a melting point of $\geq 50°$ C., for example, aromatic amines such as 4,4'-diaminodiphenylmethane, 2,4'-diamino-diphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylene diamine, m-phenylene diamine, 2,3-tolylene diamine, 2,4-tolylene diamine, 2,5-tolylene diamine, 2,6-tolylene diamine, 3,4-tolylene diamine, etc.; and aliphatic amines such as 1,12-dodecanediamine, 1,10-decanediamine, 1,8-octanediamine, 1,14-tetradecanediamine, 1,16-hexadecanediamine, etc., which may be used alone or in combination of two or more thereof. These solid amines are controlled to have a mean particle size of less than 20 μm, preferably 3 to 15 μm. When the mean particle size is more than 20 μm, the composition of this invention do not show the desired physical properties because the polyurethane can not be cured completely by heat.

The amine coated by fine particles, which is the component (B) of this invention, is prepared by means of a shearing friction blending method, that is, grinding the above solid amine so as to give the desired mean particle size, simultaneously adding the fine particles to the amine and grinding the mixture so as to give the desired mean particle size of the fine particles, and thereby the fine particles are fixed to the surface of the solid amine. Alternatively, the fine particles-coated amine can be prepared by mixing previously pulverized solid amine with the fine particles in a high-speed impact mixing machine or a compression shearing mixing machine. The high-speed impact mixing machine is more preferably used.

The fine particles includes inorganic and organic compounds, for example, inorganic compounds such as titanium oxide, calcium carbonate, clay, silica, zirconia, carbon, alumina, talc, etc.; and organic compounds such as polyvinyl chloride, polyacrylic acid resin, polystyrene, polyethylene, etc., which may be used alone or in combination of two or more thereof. The solid amine and the fine particles may be incorporated in a weight ratio of 1:0.001 to 0.5, preferably 1:0.002 to 0.4. When the ratio of the fine particles is less than 0.001, the composition of this invention shows no storage stability, and on the other hand, even when the ratio of the fine particles is over 0.5, the storage stability of the composition is no more improved.

The above blending and grinding process are resulted in a fixation of the fine particles on the surface of the solid amine. This will probably be based on the mechanisms that the fine particles are fixed on the surface of the solid amine owing to static electricity generated by grinding; the solid amine is melted in portion by exotherm generation caused by friction, impact and compression shearing due to mechanical mixig in the mixing machine; or the fine particles are physically anchored to or embedded in the surface of the solid amine; or they are chemically activated and then fixed. (Accordingly, the active amino group ($NH_2$) on the surface of the solid amine is coated by the fine particles). It is important that the fixed fine particles have a mean particle size of $\leq 2$ μm, preferably $\leq 1$ μm. When it is more than 2 μm, the fine particles are not fixed to the surface of the solid amine.

The fine particles-coated amine acts as a curing agent for the above mentioned isocyanate component (A). The remaining active amino groups may additionally be inactivated by reacting with a liquid isocyanate compound usually at a temperature of below a melting point of the amine.

The liquid isocyanate which may be used in this invention includes, for example, crude MDI, p-toluenesulfonyl isocyanate and isophorone diisocyanate, TDI, n-octadecyl isocyanate, etc. The liquid isocyanate and the solid amine may usually be incorporated in a equivalent ratio of $NH_2$/NCO of 1:0.01 to 0.5. When the inactivation using such liquid isocyanate compounds is done, the composition of this invention has more excellent storage stability than doing only coating treatment using the fine particles. When the equivalent ratio of NCO is less than 0.01, the desired increase of storage stability cannot be obtained and on the other hand, even when the ratio of NCO is over 0.5, the storage stability of the composition is no more improved.

The fine particles-coated amine (B), which is prepared by coating with the fine particles and is optionally subjected to additional inactivation with the liquid isocyanate compound, is activated at a curing temperature (usually 60° to 100° C.), and the $NH_2$ groups appeared by heating activation contribute to the curing reaction with the NCO of the isocyanate component (A). Thus, the components (A) and (B) may usually be incorporated so as to be in a equivalent ratio of the amino group and the isocyanate group of 1:0.5 to 2.0 after the heat-activation.

The heat curable composition of this invention comprises the isocyanate component (A) and the fine particles-coated amine (B) and optionally an appropreate amount of a multifunctional epoxy resin as the component (C), said epoxy resin being effective for giving excellent physical properties, particularly high durability against a compression set to the cured composition.

The epoxy resin includes, for example, bisphenol A epoxy resin, bisphenol F epoxy resin, bisphenol AD epoxy resin, phenolic epoxy resin, cresolic epoxy resin, alicyclic epoxy resin, glycidyl ester epoxy resin and glycidylamine epoxy resin, and a liquid epoxy resin is especially preferable. Incorporation of the epoxy resin (C) induces a three dimensionalization action between the epoxy resin (C) and the solid amine in addition to the above-mentioned curing reaction of the isocyanate component (A) with the solid amine, and as a result, a net work structure is formed, by which an excellent cured product having the high durability can be obtained. The epoxy resin (C) may usually be incorporated in an amount of 1 to 15 parts by weight to 100 part by weight of the isocyanate component (A). When the amount is less than 1 part by weight, the expected properties owing to epoxy resin is not exhibited, and on the other hand, when the amount is over 15 parts by weight, a rubber-like property of the cured product is deteriorated. If the properties owing to the epoxy resin (C) is desired, the content of the epoxy resin (C) may be enriched.

Further, other conventional additives may optionally be incorporated in an appropriate amount. The other additives includes, for example, urethane catalysts, solvents (e.g. week polar solvent such as aliphatic hydrocarbons, aromatic hydrocarbons, alicyclic hydrocarbons, hydrocarbon halides, ethers, esters, ketones, etc., particularly preferably aliphatic hydrocarbons), plasticizers (e.g. dibutyl phthalate, dioctyl phthalate, dicyclohexyl phthalate, diisooctyl phthalate, diisodecyl phthalate, dibenzyl phthalate, butyl benzyl phthalate, trioctyl phosphate, epoxy plasticizer, toluenesulfonamide, chloroparaffin, adipates, castor oil, etc.), thixotropic agents, ultraviolet absorbers, antioxidants, dyes and pigments, tackifiers, dehydrating agents, and the like.

The urethane catalysts includes DBU [1,8-diazabicyclo(5.4.0)-undecene-7] compounds such as DBU, DBU phenolic salt, DBU octynoate, DBU formate, etc.; amines such as monoamineds (e.g. triethlamine, etc.), diamines (e.g. N,N,N',N'-tetrametylethylene diamine, etc.), triamines (e.g. tetramethylguanidine, etc.), cyclic amines (e.g. triethylene diamine, etc.), alcoholic amines (e.g. dimethylamino methanol, etc.), etheric amines [e.g. bis(2-dimethylaminoethyl) ether, etc.]; organic carboxylic acid metal salts such as Sn compounds (e.g. dibutyltin dilaurate, tin octynoate, etc.), Pb compounds (e.g. lead octynoate, etc.), Zn compounds (e.g. zinc octynoate, etc.); imidazoles such as 2-mehylimidazole, 1,2-dimethylimidazole, and the like.

BEST MODE FOR CARRYING OUT THE INVENTION

This invention is illustrated by the following Examples and Reference Examples. The term "part" as stated hereinafter means part by weight.

Preparation 1: Preparation of a Prepolymer Having a Terminal NCO

Polyether polyol having an average molecular weight of 2,000 [Excenol 2020, manufactured by Asahi Glass, Co. Ltd.] (79.3 parts) and diphenylmethane diisocyanate (20.7 parts) were reacted at a temperature of 80° C. for 2 hours to give a prepolymer having a terminal NCO content of 3.5% and a viscosity of 20,000 cps/20° C.

Preparation 2: Preparation of a Fine Particles-Coated Amine 1,12-dodecanediamine having a mean particle size of about 2 mm (melting point 71° C., 83.3 parts) and fine particles of polyvinyl chloride having a mean particle size of about 0.3 µm (16.7 parts) were mixed and the mixture was ground in a jet mill to give a fine particles-coated amine having a mean particle size of about 10 µm (100 parts).

EXAMPLE 1

The prepolymer having a terminal NCO prepared in Preparation 1 (90.9 parts) and the fine particles-coated amine prepared in Preparation 2 were mixed and dispersed with a Chemistirrer to give a one-pack type heat curable composition.

EXAMPLE 2

The fine particles-coated amine prepared in Preparation 2 (12.4 parts) and a liquid isocyanate compound (Sumidur 44V-20, manufactured by Bayer Corp.) (2.5 parts) were mixed and dispersed, by which remaining active amino groups on the surface of the coated amine were inactivated ($NH_2$/NCO=1/0.18). Then, this reaction mixture and the prepolymer having a terminal NCO prepared in Preparation 1 (85.1 parts) were mixed and dispersed using a Chemistirrer to give a one-pack type heat curable composition.

EXAMPLE 3

The fine particles-coated amine prepared in Preparation 2 (12.5 parts) and a liquid isocyanate compound (Additive TI, manufactured by Bayer Corp.) (1.1 parts) were mixed and dispersed, by which remaining active amino groups on the surface of the coated amine were inactivated ($NH_2$/NCO=1/0.04). Then, to this reaction mixture, the prepolymer having a terminal NCO prepared in Preparation 1 (80.4 parts) and an epoxy resin (Epikote 828, manufactured by Yuka shell K.K.) (6 parts) were mixed and dispersed using a Chemistirrer to give a one-pack type heat curable composition.

REFERENCE EXAMPLE 1

1,12-Dodecanediamine having a mean particle size of about 2 mm was ground in a jet mill to give the diamine having a mean particle size of about 10 µm.

Thus prepared finely ground amine (7.7 parts) and the prepolymer having a terminal NCO in Preparation 1 (92.3 parts) were mixed and dispersed using a Chemistirrer to give a one-pack type heat curable composition.

REFERENCE EXAMPLE 2

1,12-Dodecanediamine having a mean particle size of about 10 µm (7.5 parts) and a liquid paraffin (11 parts) were mixed and dispersed. To the mixture, the prepolymer having a terminal NCO in Preparation 1 (7.4 parts) was mixed and dispersed to give a one-pack type heat curable composition.

EXPERIMENTS FOR PROPERTIES (1) Storage stability

The compositions in Example 1 to 3 and Reference Example 1 & 2 were kept in a sealed vessel at a temperature of 40° C. for 1 to 14 days, and thereafter, the increased viscosity (the initial viscosity before storage: 100) was determined. The results are shown in Table 1.

(2) Curability at 100° C. and physical properties of the cured product

The compositions in Example 1 to 3 and Reference Example 1 & 2 were spreaded on a releasing paper with a thickness of 2 mm, cured by heating at 100° C. for 10 minutes, and thereafter, each No. 3 dumbbell property of the film formed by the curing was determined, respectively. The results are shown in Table 1.

(3) Gelation time

The compositions in Example 1 to 3 and Reference Example 1 & 2 were spreaded on a hot plate with a thickness of 200 µm and each gelation time at 100° C. was determined, respectively. The results are shown in Table 1.

TABLE 1

|  | Example | | | Reference Example | |
| --- | --- | --- | --- | --- | --- |
|  | 1 | 2 | 3 | 1 | 2 |
| (1) storage stability at 40° C. | | | | | |
| after 1 day | 140 | 127 | 135 | 231 | 186 |
| after 7 days | 170 | 160 | 150 | 328 | 498 |
| after 14 days | 180 | 165 | 185 | 537 | gelation |
| (2) No. 3 dumbbell property (100° C. × 10 min) | | | | | |
| breaking strength ($kgf/cm^2$) | 21.9 | 29.8 | 35.5 | 22.3 | 15.6 |
| elongation at break (%) | 280 | 300 | 260 | 270 | 200 |
| (3) gelation time | ≦10 sec | ≦10 sec | ≦10 sec | ≦10 sec | ≦10 sec |

Preparation 3: Preparation of a Fine Particles-Coated Amine 1,12-dodecane diamine having a mean particle size of about 8 µm (melting point 71° C., 76.9 parts) and ultra fine particles of titanium oxide having a mean particle size of about 0.02 µm (23.1 parts) were mixed and grinded in a Hi-X Mixer (manufactured by Nissin Engineering K.K.) to give a fine particles-coated amine having a mean particle size of about 8 µm (100 parts).

Preparation 4: Preparation of a Fine Particles-Coated Amine 4,4'-diaminodiphenylmethane having a mean particle size of about 12 µm (melting point 91° C., 98 parts) and a dispersion of a hydrophobic silica having a mean particle size of about 0.02 µm (2 parts) in n-hexane were treated with a wet blending process using Dispercoat (manufactured by Nissin Engineering K. K.) to give a fine particles-coated amine having a mean particle size of about 12 µm (100 parts).

Preparation 5: Preparation of a Fine Particles-Coated Amine 1,10-dodecane diamine having a mean particle size of about 2 mm (melting point 62° C., 71.4 parts) and titanium oxide having a mean particle size of about 0.02 μm (28.6 parts) were mixed and the mixture was ground in a jet mill to give a fine particles-coated amine having a mean particle size of about 10 μm (100 parts).

EXAMPLE 4

The prepolymer having a terminal NCO prepared in Preparation 1 (86.5 parts), the fine particles-coated amine in Preparation 3 (1.4 parts) and a liquid isocyanate compound (Sumidur 44V-20) (2.1 parts) were mixed and dispersed using a Chemistirrer to give a one-pack type heat curable composition.

EXAMPLE 5

The prepolymer having a terminal NCO prepared in Preparation 1 (90.9 parts), the fine particles-coated amine in Preparation 4 (8.3 parts) and a liquid isocyanate compound (Sumidur 44V-20) (0.8 parts) were mixed and dispersed using a Chemistirrer to give a one-pack type heat curable composition.

EXAMPLE 6

The prepolymer having a terminal NCO prepared in Preparation 1 (89.2 parts) and the fine particles-coated amine in Preparation 5 (8.9 parts) were mixed and dispersed using a Chemistirrer, and thereafter, a liquid isocyanate compound (Sumidur 44V-20) (1.9 parts) was mixed and dispersed using the Chemistirrer to give a one-pack type heat curable composition.

EXAMPLE 7

The prepolymer having a terminal NCO prepared in Preparation 1 (84.2 parts), the fine particles-coated amine prepared in the same manner of Preparation 3 (12.8 parts) except using a hydrophobic silica instead of the ultra fine particles of titanium oxide and a liquid isocyanate compound (Additive T1, manufactured by Bayer Corp.) (3.0 parts) were mixed and dispersed using a Chemistirrer to give a one-pack type heat curable composition.

The one-pack type heat curable compositions in Examples 4 to 7 were also subjected to the same experiments as mentioned above. The results are shown in Table 2.

TABLE 2

| | Example | | | |
|---|---|---|---|---|
| | 4 | 5 | 6 | 7 |
| (1) storage stability at 40° C. | | | | |
| after 7 days | 111 | 115 | 160 | 130 |
| after 14 days | 114 | 120 | 170 | 135 |
| (2) No. 3 dumbbell property (100° C. × 10 min) | | | | |
| breaking strength (kgf/cm$^2$) | 45.0 | 51 | 40 | 48 |
| elongation at break (%) | 200 | 180 | 200 | 170 |
| (3) gelation time | ≦10 sec | ≦10 sec | ≦10 sec | ≦10 sec |

INDUSTRIAL APPLICABILITY

The composition of this invention (Example 1 to 7) shows an excellent storage stability with keeping a level of physical propertiies at low-temperature curing (100° C.×1 min), and hence is useful as a sealant, a coating material (including a paint), an adhesive and other formed products.

We claim:

1. A heat curable composition which comprises
   (A) an isocyanate-functional material selected from the group consisting of a polyisocyanate compound and an urethane prepolymer having a terminal active isocyanate group which is prepared by reacting a polyol component with an excess amount of a polyisocyanate compound, and a combination thereof; and
   (B) a fine particles-coated amine which is prepared by coating the surface of solid amine particles having active amino groups thereon, a melting point of ≧50° C., and a mean particle size of ≦20 μm with fine particles of an inorganic or organic compound selected from the group consisting of titanium oxide, calcium carbonate, clay, silica, zirconia, carbon, alumina, talc, polyvinyl chloride, polyacrylic acid resin, polystyrene, polyethylene, and a combination of two or more thereof having a mean particle size of ≦2 μm in a ratio of the solid amine/the fine particles of 1/0.001 to 0.5 by weight.

2. The heat curable composition according to claim 1, wherein the component (A) and the component (B) are incorporated in an equivalent ratio of the amino group and the isocyanate group of 1:0.5 to 2.0 after heat-activation.

3. The heat curable composition according to claim 1, wherein the remaining active amino groups of the fine particles-coated amine (B) are additionally inactivated by reacting with a liquid isocyanate compound, said liquid isocyanate compound being incorporated in a equivalent ratio of the amino group of the solid amine and the isocyanate group of the liquid isocyanate compound of 1:0.01 to 0.5.

4. The heat curable composition according to claim 1, wherein a multifunctional epoxy resin is added as a component (C).

5. An amine coated by fine particles which is prepared by coating the surface of solid amine particles having active amino groups thereon, a melting point of ≧50° C., and a mean particle size of ≦20 μm with fine particles of an inorganic or organic compound selected from the group consisting of titanium oxide, calcium carbonate, clay, silica, zirconia, carbon, alumina, talc, polyvinyl chloride, polyacrylic acid resin, polystyrene, polyethylene, and a combination of two or more thereof, having a mean particle size of ≦2 μm in a ratio of the solid amine to the fine particles of 1/0.001 to 0.5 by weight.

6. The fine particles-coated amine according to claim 5, wherein the remaining active amino groups of the fine particles-coated amine are additionally inactivated by reacting with a liquid isocyanate compound, said liquid isocyanate compound being incorporated in a equivalent ratio of the amino group of the solid amine and the isocyanate group of the liquid isocyanate compound of 1:0.01 to 0.5.

7. A method of using the amine coated by fine particles according to claim 5 as a curing agent, comprising heating an isocyanate-functional material in the presence of the amine coated by fine particles to a temperature sufficient to effect curing of the material.

* * * * *